MEMORY LINE DEVICE

Filed Feb. 7, 1955 8 Sheets-Sheet 1

INVENTORS
RAYMOND A. BARBEAU
PAUL M. YOUNG
BY [signature]
ATTORNEY

INVENTORS
RAYMOND A. BARBEAU
PAUL M. YOUNG
BY [signature]
ATTORNEY

MEMORY LINE DEVICE

Filed Feb. 7, 1955

INVENTORS
RAYMOND A. BARBEAU
PAUL M. YOUNG
BY [signature]
ATTORNEY

INVENTORS
RAYMOND A BARBEAU
PAUL M. YOUNG
BY
ATTORNEY

INVENTORS
RAYMOND A. BARBEAU
PAUL M. YOUNG
BY
ATTORNEY

INVENTORS
RAYMOND A. BARBEAU
PAUL M. YOUNG
BY
ATTORNEY

Aug. 5, 1958 R. A. BARBEAU ET AL 2,846,009

MEMORY LINE DEVICE

Filed Feb. 7, 1955 8 Sheets-Sheet 7

INVENTORS
RAYMOND A. BARBEAU
PAUL M. YOUNG

BY [signature]

ATTORNEY

INVENTORS
RAYMOND A. BARBEAU
PAUL M. YOUNG
BY [signature]
ATTORNEY

United States Patent Office 2,846,009

Patented Aug. 5, 1958

2,846,009

MEMORY LINE DEVICE

Raymond A. Barbeau, Poughkeepsie, and Paul M. Young, Pleasant Valley, N. Y., assignors to International Business Machines Corporation, New York, N. Y., a corporation of New York Application February 7, 1955, Serial No. 486,472

10 Claims. (Cl. 164—115)

This invention relates to card punches and more particularly to an improved memory device for a tape controlled card punch.

In business installations of modern times, a typewriter is operated to simultaneously record information on a document and as code perforations in a tape. It is then desirable on some occasions to take the tape so formed and use it to condition a card punch to punch corresponding information in an IBM card. In the punching of the paper tape from the typewriter, as is more particularly explained in the U. S. patent application, Serial No. 250,647, now Patent No. 2,784,785, C. R. Doty, it has been pointed out that during the operation of the typewriter, the typist might make a mistake. The operator corrects the mistake by punching an error code in the tape, and then she re-types the information correctly. In some typewriter tape machines the operator also punches a code to indicate the fact that a line has been punched correctly.

When a card is punched from such a paper tape, the tape may be fed in reverse order (this is conventionally known as reverse tape reading) through a tape sensing unit and if a correct line code is read the information following that code is punched in a card. If an error signal is read, however, the next portion of the tape will be skipped, until another correct line code has been read to condition the punch again.

In other modifications, a tape is read serially in the order in which the tape had been prepared (this is conventional forward tape reading) and the information is sent to the card punch. In this instance, if an error has been produced in the tape and consequently reproduced in the card then it is necessary to discard the card that has already been punched, and to punch a new card. In such an instance, it would be necessary either to re-perforate the tape with all the information to be punched into the new card, or use the good information in the error card which is about to be destroyed, as a memory storage device to reproduce good information back into the new card, and then read the correctly punched information from the tape.

It is a first object of this invention, therefore, to provide in a mechanism of the type described, an improved memory storage device wherein a card which contains good and error information is used to operate a card punch to punch the good information back into a second card. At the completion thereof the device is conditioned to resume tape reading to perforate the rest of the card with the desired correct information.

It is a still further object of this invention, to provide an improved error correction device for a card punch which is operable in conjunction with a forward tape reading mechanism.

It is still a further object of this invention to provide a mechanism which will identify a card that has been punched, with a signal indicating that it is either a satisfactorily completed or an error card.

Other objects of the invention will be pointed out in the following description and claims and illustrated in the accompanying drawings, which disclose, by way of example, the principle of the invention and the best mode, which has been contemplated, of applying that principle.

In the drawings, Fig. 1 is a schematic representation of a card punched in accordance with information in a tape.

Briefly, this invention relates to a card reading and punching device such as that more commonly shown as IBM Type 024 Card Punch which is disclosed in complete detail in U. S. Patent 2,647,581. The invention contemplates using a tape reader of the type disclosed in U. S. Patent 2,637,399, to condition the card punch to perforate a card as it passes through the punch station of the card punch, and then to condition the card punch, upon the reading of an error signal in the tape (and simultaneous punching of the error information in the card) to advance the card from the punch station to the card read station, where the correct information in the error card is read and used to perforate a new card at the card punch station, while the tape reader remains at rest. After the correct fields of the card have been re-perforated into the new card, then the tape reader is turned on again to condition the punch station to perforate the remainder of the card in accordance with the information in the tape.

In introduction, a general statement will be made of the operation of a mechanism of this general type in order to present the background information for the understanding of the subject invention.

In the operation of a typewriter tape punch, such as that shown in U. S. patent application, Serial No. 250,647, C. R. Doty, the manipulation of the typewriter keys acts to condition a paper punch to perforate the tape in accordance with some predetermined code (see Fig. 8 for code example). Actually, in the illustration shown in Fig. 1, such a tape has been shown not as it is actually perforated, but with the interpreted information contained in the tape. For example, it is the intention to show that as an operator types Harry L. Williams on line one of a typewriter form; and then types 235 Sanborn Avenue on line two; and Olin Lake, N. Y. on line three; the corresponding code, simultaneously, will be punched into the tape.

Figure 1:
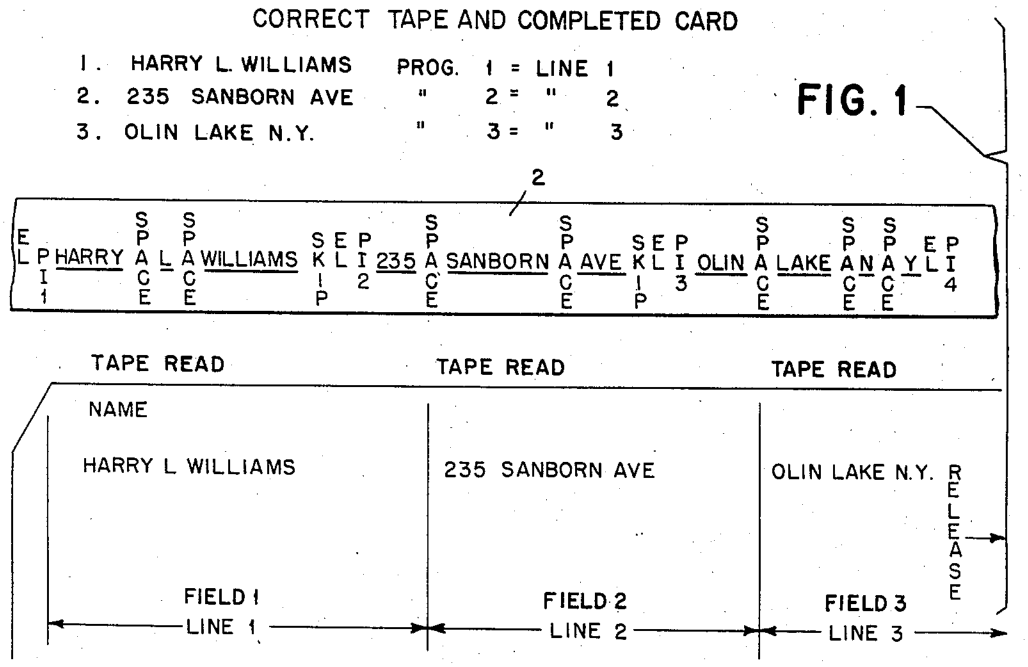

Generally, in the typewriter tape punch, a program switch is used to condition a tape punch to punch control codes. These codes, while not specifically shown in the aforementioned Doty application, Serial No. 250,647 can be set up on a line basis whereupon the depressions of a program key or switch automatically instructs the tape punch to insert an end of line code (EL) preceding the program indication code PI–1. This punching sequence is simply a matter of internal wiring to control relays. Accordingly, when a switch (or key) is used to condition the machine for line 1, which is to be perforated as "Harry" space "L" space, "Williams" an end of line code EL is first punched in the tape followed by a PI–1 code. After printing (and simultaneously punching the information in line 1) the typewriter tab key is depressed to bring the typewriter to the end of program (or line) one. This puts a skip code in the tape. The typist may then visually inspect the typed line, and if correct, she starts a new line by closing a program 2 switch which action perforates an end of line code (EL) and PI–2 code in the tape. In program 2, the operator types "235" space, "Sanborn" space "Avenue" then the tab key causes another skip code to be punched in the tape and advances the carriage through the end of line or program 2. Then after program 2 has been satisfactorily typed (and simultaneously punched in the tape) the typist closes the program 3 switch which perforates an End of Line code (EL) and PI–3 code into the tape. The operator then types "Olin" space "Lake" space "N" space "Y" whereupon the typewriter carriage is advanced to its program 4 position. Upon closing the program 4 switch, another EL code and PI–4 code is perforated in the tape. As the tape 2, shown in Fig. 1, is passed through a tape reader of the type shown in U. S. Patent 2,637,399, the perforations in the tape are sensed and converted to card codes which are used to condition the punch magnets at the punch station of an 024 Card Punch of the type shown in U. S. Patent 2,647,581. The corresponding card at the punch station is divided into fields or lines with one field equal to a corresponding line or program as set up on the typewriter tape punch. For example, the first character of line or field 1 is "H" and this "H" is punched into the card at column 1 of field 1. When "a" is read in the tape "a" is punched into the card at column 2, etc. The "space" puts a space in between the characters such as "Harry" space "L" space, and then the "Williams" is perforated into the card in accordance with the reading of the tape. The skip code in the tape energizes the skip control relay in the card punch to shut off the tape reader and to advance the card into the first column of the next field. When the card reaches the first column position of the second field tape reading is resumed, and information read in the tape is correspondingly punched in the card. The same pattern is followed for line or field 3. Upon completion of field 3, the card is released to a predetermined column where a code is punched in the card (as hereinafter explained) to indicate that the card is punched in accordance with the tape.

Figures 2, 8:
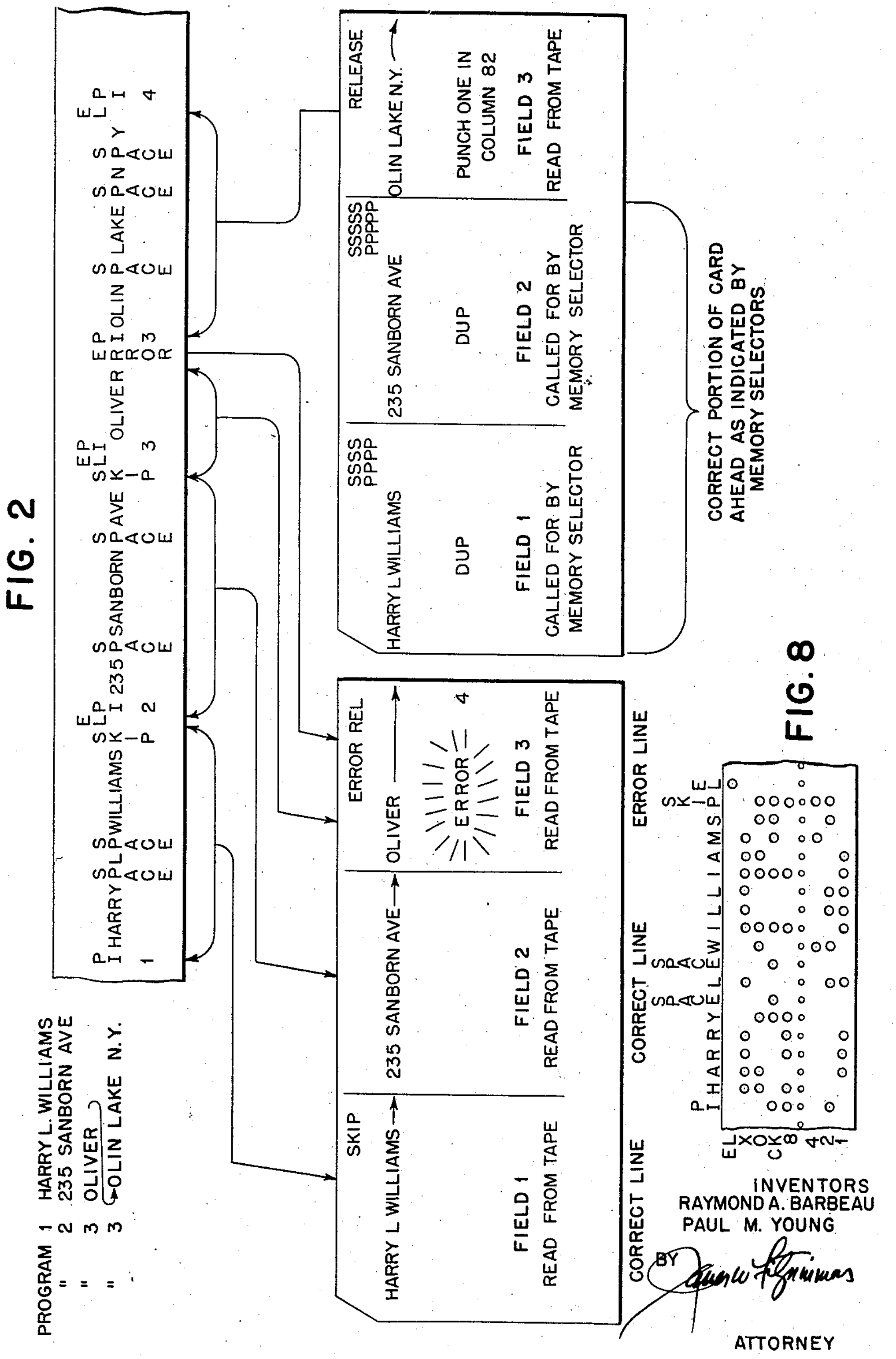
Fig. 2 is a schematic representation of a card having some information properly punched and then an error with the error card being duplicated from the good information in the first card.
Fig. 8 is a representation of the actual tape punching for a portion of the tapes shown in Figs. 1 and 2.

Reference is now made to Fig. 2 to show what would happen if an error were punched in the tape. In Fig. 2 illustration, the operator, in program 3, instead of typing "Olin Lake N. Y." typed "Oliver" and then immediately sensed the error. The Fig. 2 tape up to this point is exactly like the tape shown in Fig. 1.

After the operator has noted the error, she has to correct the third line, and in the process, an error code is automatically punched into the tape. The typist again closes the program 3 switch before retyping line three. The operator then properly retypes third line (or program 3) on the form. When she finishes the third line she sets up program 4, which automatically punches an end of line code saying that line 3 was completed satisfactorily.

With reference now to the card which is to be punched from the tape, it will be noted from Fig. 2 that as field 1 on the tape is read, the Harry L Williams is properly punched in field 1 of the card, then the skip signal in the tape causes the card to advance to the beginning of field 2. In this system the end of line code EL and the program code are non punching codes, therefore, there will be no punching in the card and the card will remain at the first column of field 2 until the tape reader senses the "2" in the second line. The tape reader then will go through line 2 and correspondingly punch the information into the second field of the card. The skip signal will carry the card into the first column of field 3. The tape reader will then start reading Oliver and Oliver will be punched simultaneously in the card, whereupon the tape reader will sense the error code. The error code in accordance with this invention conditions the card punch to advance the error card to column 82 where a 4 hole is punched before releasing the card to the next (or read) station. Simultaneously a new card is advanced into the punch station of the card punch. When this card order has been attained, the circuitry, hereinafter explained, interrupts tape reading until all the information in fields 1 and 2 of the error card has been duplicated in the corresponding fields 1 and 2 of the new card at the punch station. The circuitry is then such that the tape reader is again turned on, when the first column of field 3 of the new card reaches the card punch station. The tape then directs the punching of field 3. Upon correct completion of field 3, the card is released to column 82 where a 1 hole is punched to indicate a satisfactorily completed card.

Incidentally, both the error card and the correct card are fed into the receiving hopper of the card punch, which cards are later sorted to pick out the error cards from the correct cards.

*Description*

Figure 3:
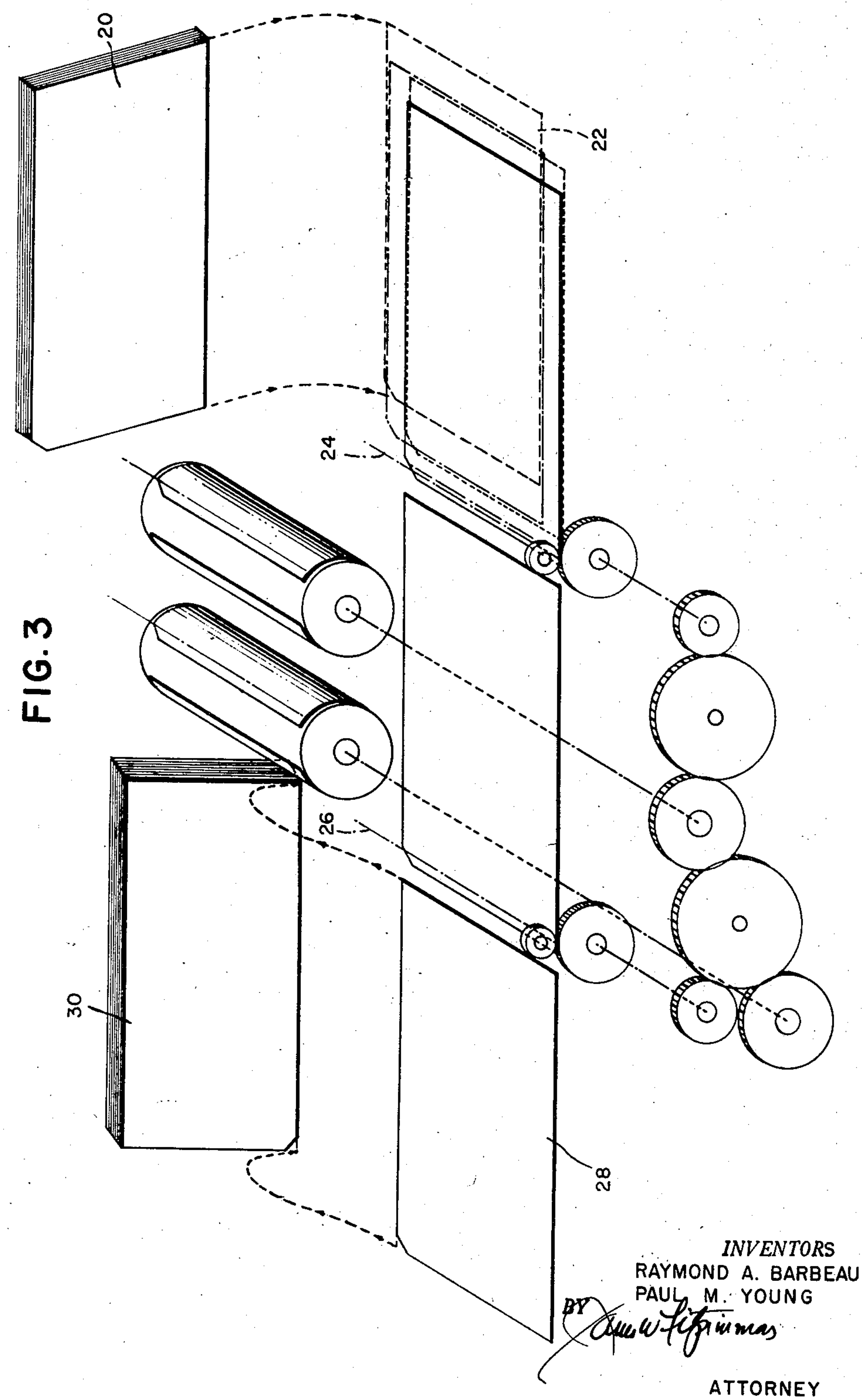
Fig. 3 is a schematic view of a path of a card through an IBM Card Punch.

Reference is now made to Fig. 3 of the drawings which shows schematically the elements of the card punch as more particularly described in the U. S. Patent 2,647,581.

Generally speaking, an IBM card is fed sequentially from a storage hopper 20 into an intermediate position 22. During the next card feed cycle, the card is moved into alignment with the punch line 24 through various mechanical means which are well known in the art. Simultaneously, a card which had been at the punch line is advanced to the read line 26, and the machine is interlocked so that it is necessary to have a card at both lines, or stations as they are generally called, in order for the machine to punch cards in accordance with the instructions received from the tape.

The timing of the mechanism is such that the card at the read line 26 is one column in advance of the corresponding column at the punch line 24. The purpose of this is to permit sufficient time for a card at the read line to be read and the information so read to be used to condition the punch magnets at the punch line so that when the corresponding column of the card to be punched is aligned with the punch line, the information read and stored in the punch magnets, will be punched into the proper column. As a card leaves the card read station it is advanced to a stacking position 28 from which it can be gripped and flipped into a storage hopper 30.

Figure 4:
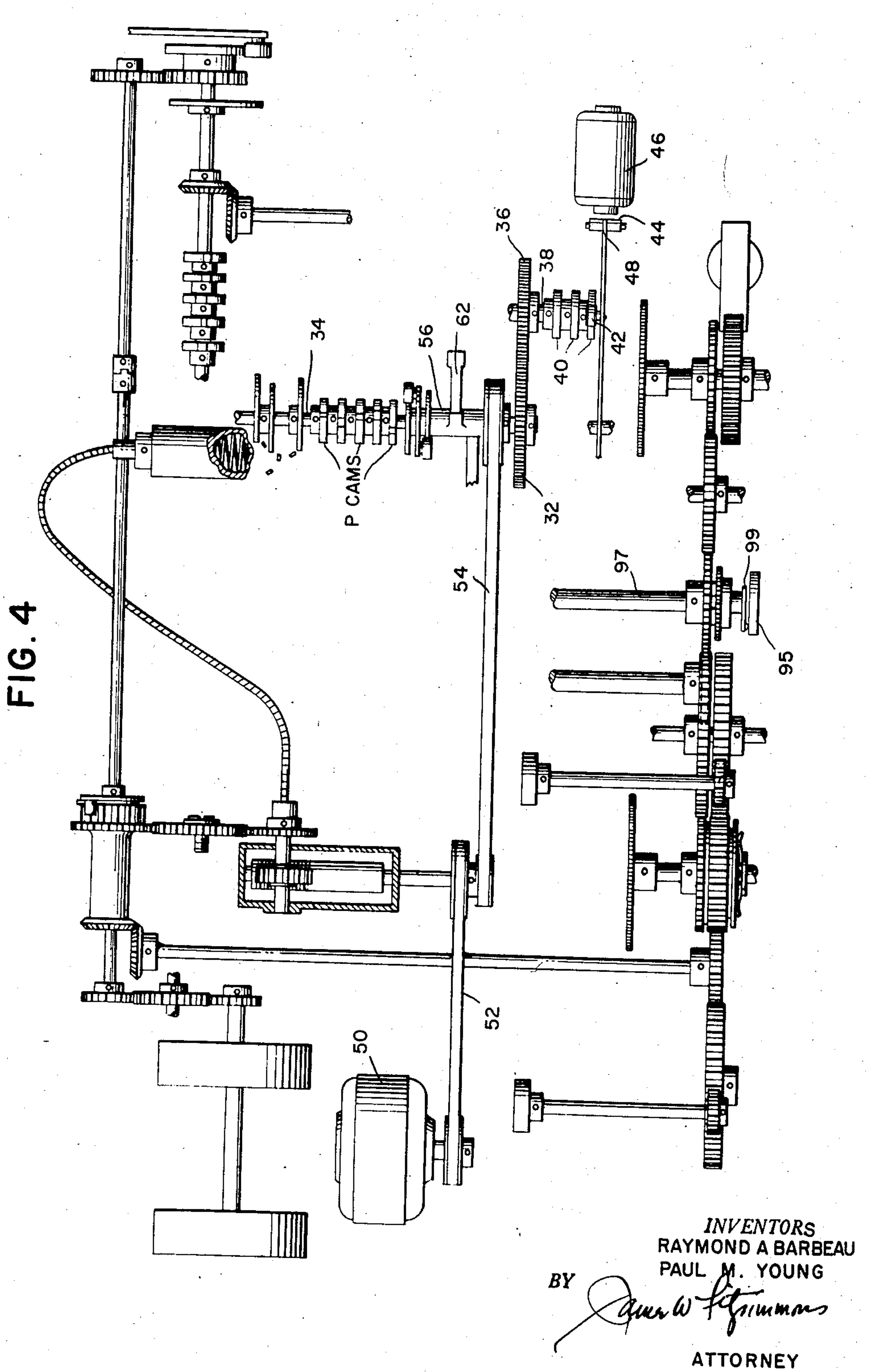
Fig. 4 is a schematic view of the mechanism of an IBM Tape to Card Punch.

It is obvious that a sequence of coordination must be established between the tape reader and the corresponding column of the card punch. The sequence is provided, as indicated in Fig. 4 of the drawing, wherein it is shown that a gear 32 is mounted on the end of punch shaft 34 and meshed with a gear 36 which drives a reader cam shaft 38 having a plurality of cams 40 thereon. The cams 40 rotate through one revolution with every revolution of the punch shaft 34. The cams 40 operate to permit tape reading (one column of tape per revolution of cams 40) when the reader control magnet 46 is energized. As the reader control magnet 46 is energized, its armature 44 is moved out of the path of an extension 48 on a cam follower 42, permitting the cam follower 42 to drop in to peripheral engagement with the cam 40, thus allowing reading pins to enter the tape. Each reading operation is followed by one column of tape advancement, as disclosed in U. S. Patent 2,637,399.

Reference is now made to Fig. 4 of the drawings wherein the motor 50 is shown continuously driving the belts 52 and 54, the latter of which is connected via the punch clutch 56 to punch clutch shaft 34. The punch clutch shaft has a plurality of mechanical and electrical cams thereon, with the mechanical cams operating the actual card punch as will hereinafter be explained and the electrical cams operating contacts so that for each revolution of the shaft 34 the electrical cams close contacts in accordance with the peaks on the cam. The contacts P–1 through P–7 are thus operated during every punch shaft revolution.

Figure 5:
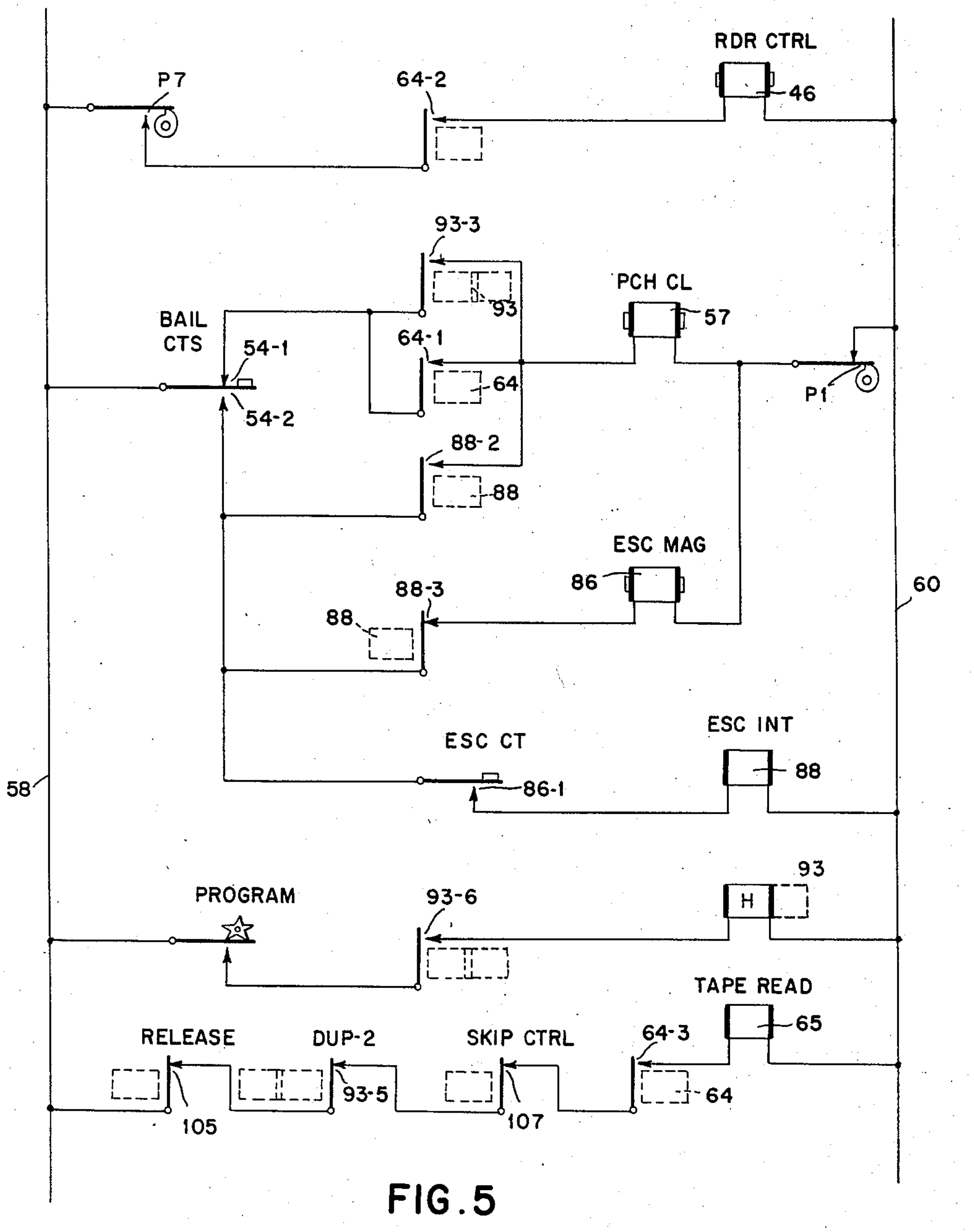
Fig. 5 is a schematic wiring diagram.

With reference to Fig. 5 of the drawing, and assuming that the machine has just been turned on, then in order to start a tape reading operation it will be necessary to first cause a revolution of the punch shaft by energizing the punch clutch magnet across the line 58, 60. It will be noted that in order to energize the punch clutch magnet, a normally closed point on a bail contact 54–1 is encountered. The pulse from the positive side 58 can go through this normally closed contact and through the tape reader control contacts 64–1 (which are closed by a separate relay, as later explained), to pick up the punch clutch magnet. The cam contact P–1 is always closed when the punch shaft is not in operation.

In order to explain the relationships of the elements of this machine, it is necessary to understand that the machine operates in cycles which are measured in accordance with the time for one revolution of the punch shaft 34. More specifically, in one 360° revolution of the punch shaft, the electrical contacts of the machine divide this cycle into two approximately equal operational portions. In the first of these operational portions, or in approximately the first half cycle, reading and punching takes place. In the second operational portion, or in the second half of the cycle, the escapement and information storage is accomplished (which storage is held until the first half of the succeeding cycle).

Figure 6:
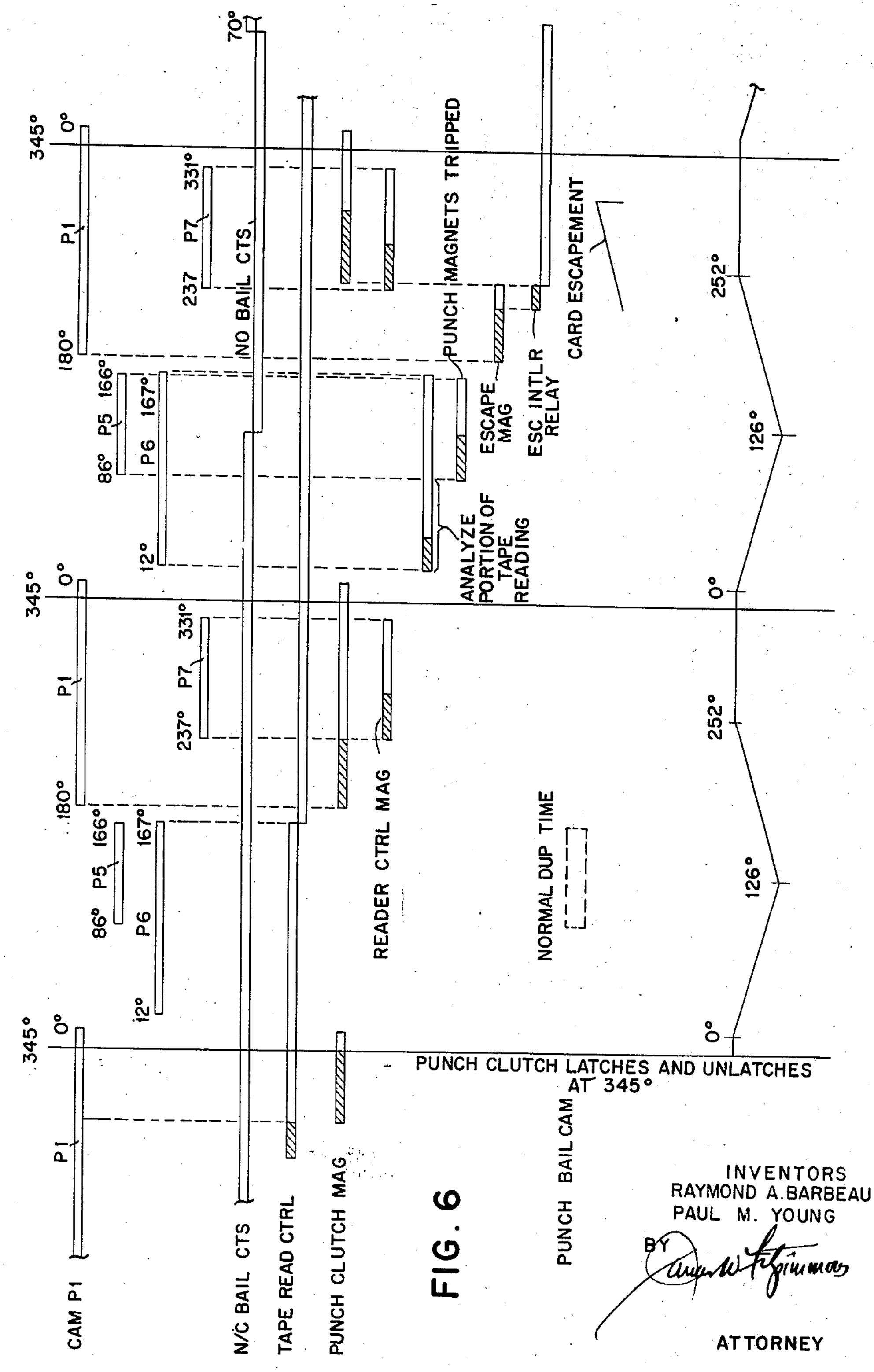
Fig. 6 is a schematic sequence chart of the mechanism of this invention.

To clarify this breakdown, the first half cycle is divided into two portions. As indicated in Fig. 6 tape perforations are read and analyzed during the first portion of the first half machine cycle, and card punch magnets are energized during the second portion of the first half machine cycle. Consequently, information read either from the tape, or the card read station (but not both) is used to impulse card punch magnets during the second portion of the first half cycles. Energization of one or more of the punch magnets transfers the bail contacts 54 which remain transferred during the whole second half machine cycle and the first portion of the succeeding first half machine cycle.

Furthermore, it is important to understand that the punch bail (hereinafter described) which operates to cause the actual perforation of the card at the card punch station starts to move away from its rest position at the beginning of each machine cycle, and does not return to its home position until the second half of each machine cycle. The movement of the bail, punches only information stored by the punch magnets before the bail started operating. Consequently, information read in one machine cycle is always punched in the card during the first half of the succeeding machine cycle.

As completely described in U. S. Patent 2,647,581, single column escapement of a card at both the read and punch stations is conditioned by the closing of the normally open bail contacts. Furthermore, as a result of escapement, the punch clutch is energized for another punch shaft operation. (See Fig. 5.)

Figure 7:
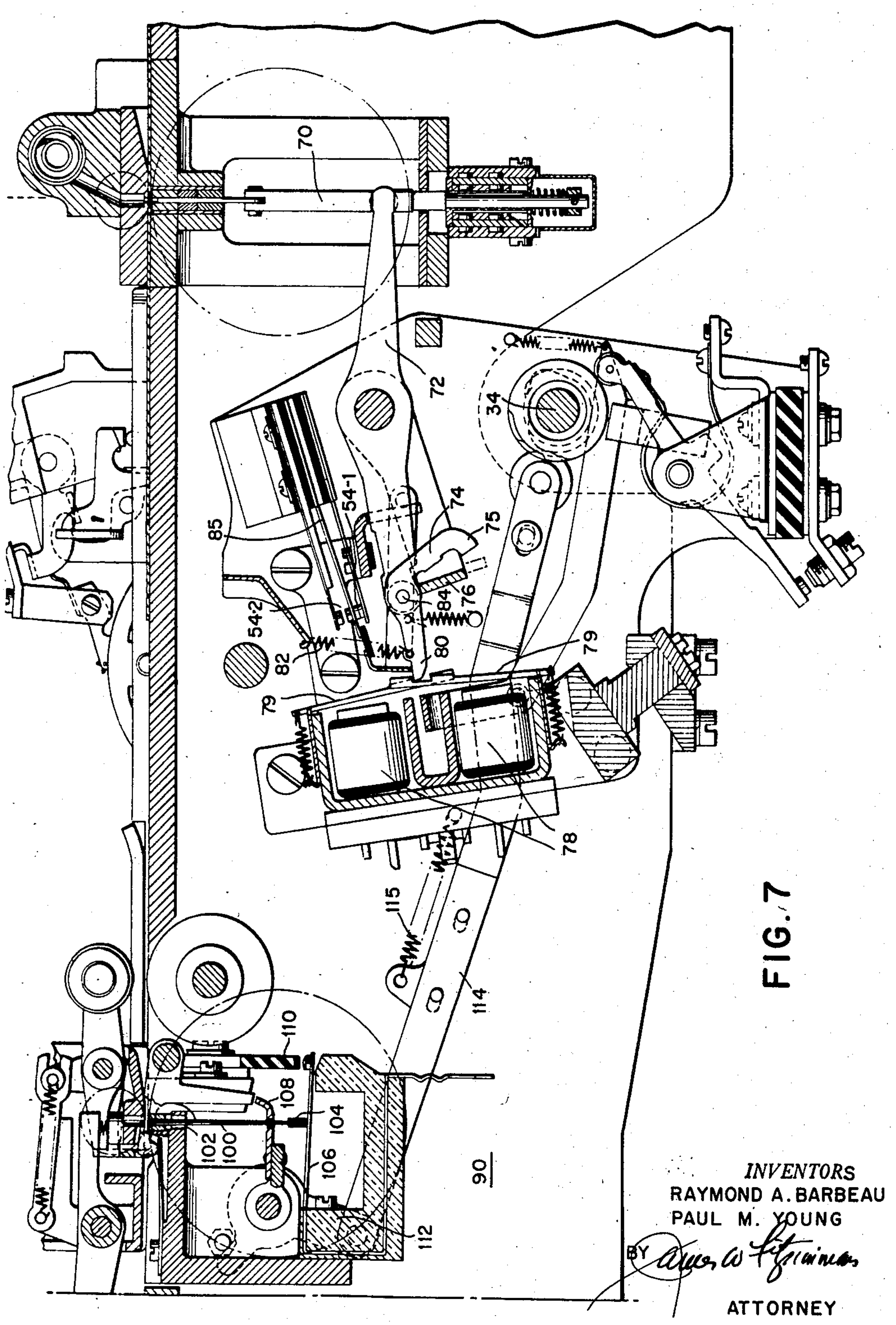
Fig. 7 is a front section of a portion of the IBM Card Punch.

In order to explain this further, reference is made to Fig. 7 of the drawings wherein the card punching mechanism is shown. More specifically, a punch 70 (of which there are 12) is controlled by its associated punch arm 72 which in turn is operated by the interposer 74 being hooked under the punch bail 76. The interposer in turn, is operated by the punch magnets 78 so that when a punch magnet is energized, its armature 79 is attracted to get out of the path of the tail 80 of the interposer 74 and thereby permit the spring 82 to rock the interposer about its pivot point 84 so that its nose 75 can get under the end of the punch bail 76. However, as has been explained, the machine cycle timing is such that the bail 76 will have been rocked down to its dotted line position at the time that the punch magnet is energized, and therefore the punch bail will not operate the punch arm 72 during the cycle that the punch magnet is energized. In the meantime, since the armature 79 of the punch magnet is out of the way, the interposer 74 is rocked clockwise as the punch bail 76 assumes Fig. 7 position to cock the interposers under the punch bail, whereupon the next time the punch bail goes down to its dotted line position it will cause the punch arm 72 to operate to force the punch 70 through the card. As an incidental function of energizing the punch magnets, the punch bail contact 54–1 is operated by the tail 80 of the interposer 74, that is, the common strap 85 of the punch bail contact is transferred thereby closing 54–2 and opening 54–1 permitting the energization (Fig. 5) of the escape magnet 86 through P1 (which closes at the beginning of the second half of the machine cycle) to advance the card to the next card column and thereby energize the punch clutch. The closing of the escape contacts 86–1 energizes the escape interlock contacts 88–2 to energize the punch clutch for the next cycle. The escape magnet is then dropped out by the opening of contacts 88–3 allowing only a single column escapement. With contact 64–2 closed, then as electrical cam P–7 makes, during each punch clutch cycle the reader control magnet 46 is reimpulsed for another tape read cycle.

It should be noted here that the contact 54–2 must be closed to obtain a card escapement, and this in turn is caused by the energization of a punch magnet. When a non punching code is read in the tape, bail contact 54–1 will remain closed to keep the punch shaft operating in cycle, and in turn the reader control magnet will be energized with every revolution of the punch shaft 34 so that any number of non punching tape codes may be read without advancing the card.

With this information, it is obvious that so long as the tape read control relay 64 is energized we will continue to have machine cycles. That is, the tape reader will read information from the tape, translate this information in an analyzer, and store the translated information in the punch magnets which information will be punched into the card in each subsequent machine cycle.

*Duplication*

Figure 9:
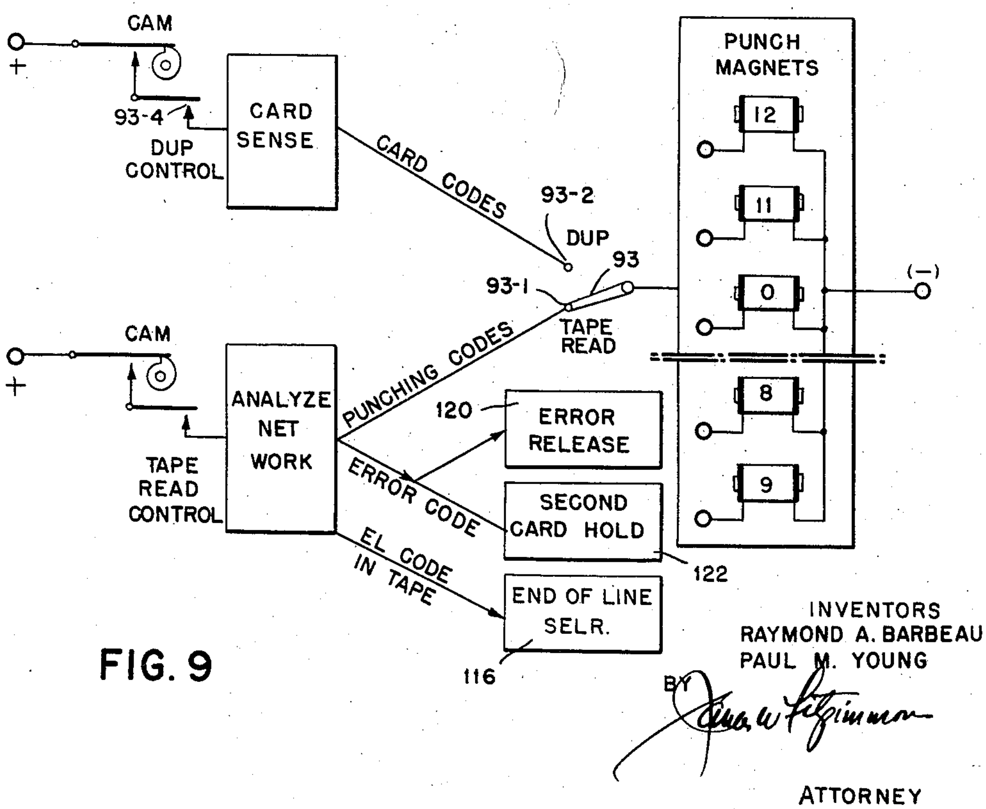
Fig. 9 is a block diagram of a portion of the improved Tape to Card Punch.

In transferring good information from an error card at the read station to a new card at the punch station it is necessary to understand that the correct information read from the column of the card at the read station is used to operate the card punch magnets in the same manner that they are energized from the tape reader, provided the duplication control relay contacts 93–2; 93–4 are closed as viewed in Fig. 9.

At the card read station (Fig. 7) a card read mechanism 90 is provided for reading the perforations in the card, which information is then sent back to the punch magnets. The card reading mechanism 90 (Fig. 7) comprises basically a plurality of mechanical sensing pins 100 which are slidably mounted for axial movement through bearings or supports 102 in response to the vertical movement of insulated pads 104 which are moved in response to the spring contacts 106. More specifically, the spring contact 106 urges the insulated pads 104 upward tending to drive the pins 100 into the card, but a bail 108 restricts the vertical movement of the pads 104 and accordingly the pins 100 are normally held out of the card. When the bail 108 is lifted, then the spring contacts 106 tend to lift the pads 104 to push the pins into those apertures which lie in the card column at the read line. In lifting the pins into the apertures in the card, the contacts engage a common contact 110 to establish a circuit from a read pin 100 to its corresponding punch magnet. The operation of the mechanism is such that a crank 112 is provided on the end of the bail 108 and the crank arm is connected via the link 114 to a cam on the punch shaft 34. Link 114 is biased to the right by spring 115, and therefore every time the punch clutch shaft is rotated through one cycle, the link 114 is moved to rock the bail 108 to permit the pins to enter the card during the second portion of the first half machine cycle, which as heretofore explained, corresponds to the time that information from the tape analyzer is used to energize the punch magnets (during the tape reading operation).

It will be remembered that the card at the read station is one column in advance of the card at the punch station and the card punch magnets are energized either from the card read station, or the tape reader (but not both).

Reference is now made to Fig. 5 of the drawing, wherein it is shown that normally open points 93–3 of a duplicate relay 93 are in parallel with the tape read relay points 64–1. When the duplicate relay 93 is energized, a circuit is provided from the plus side of the line 58 across the bail contact 54–1 which is normally closed through duplicate relay points 93–3 to the punch clutch magnet, and then through cam contact P1 to the negative side of the line 60. This causes one operation of the punch shaft 34, during which time the card read pins sense information at the card read line. As the punch shaft goes through one cycle, the common of the bail contact is transferred to its normally open side (if holes are sensed at read line and punch magnets are energized) whereupon a circuit is provided through the escape magnet 86 and through PI to advance both cards. After the pulse through the duplicate points 93–3 picks up the punch clutch to start one punch cycle, the same situation exists as when the punch clutch was first engaged through the tape read contacts 64–1. That is, the duplicate relay 93 is held closed through impulses from the program drum and further impulses to the punch clutch magnet must take place through the transferred bail contacts and the escapement contacts, as previously explained. Incidentally, circuits are provided to shunt around the normally open bail contact 54–2 as shown in U. S. Patent 2,647,581 in order that blank columns in duplication fields may be spaced over.

From the second column on, the sequential operation of card reading and then the punching of that information during the next machine cycle, will take place. But, it should be understood that while a column at the read station is being read, the information read in the previous column is simultaneously being punched in its proper column. Therefore, one punch cycle always follows the last card read cycle.

*Error correction*

Figure 10:
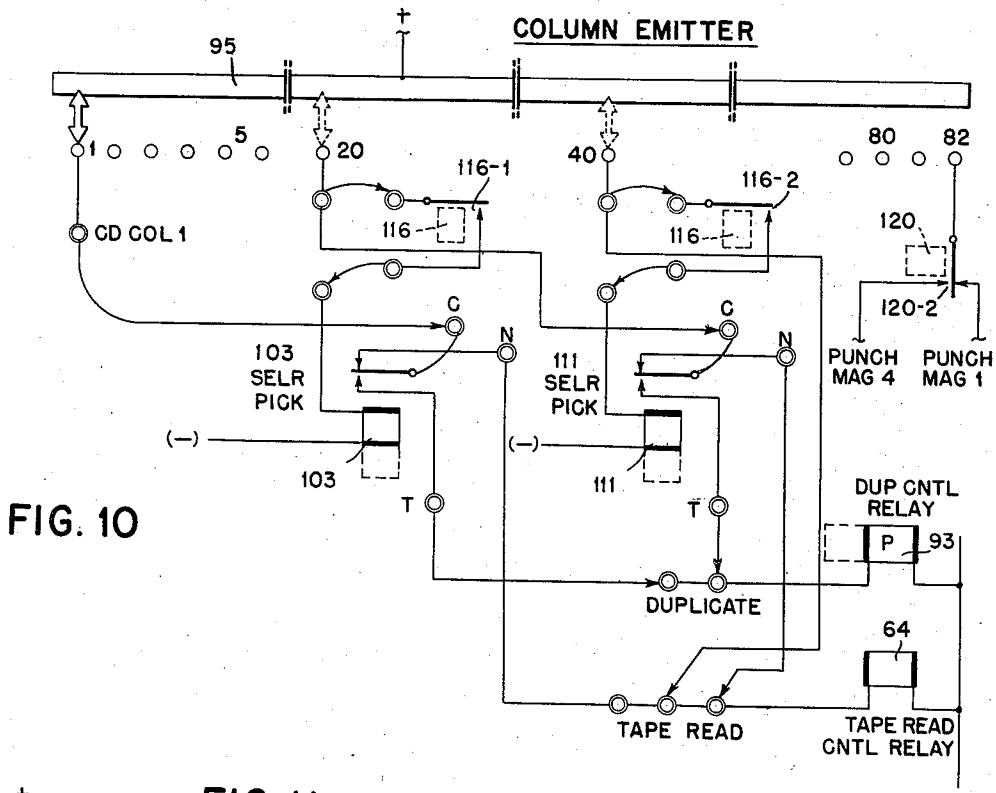
Fig. 10 is a schematic wiring diagram of a line memory feature for the improved Tape to Card Punch.

Reference is now made to Fig. 10 of the drawing wherein an emitter 95 is schematically shown. The emitter 95 is also shown in Fig. 4 mounted on the end of a program drum shaft 97. The emitter has a rotor 99 which moves in unison with a card advancing through the machine. That is, as a card moves column by column past the card read station, a position at the emitter corresponding to the column of the card at the read station is conditioned to emit an electrical pulse. The emitter has terminals corresponding to card columns and the emitter terminals can be wired to initiate machine functions. As an example, the emitter terminal for column 1 is hot every time column 1 of a card is at the card read line.

With reference to Fig. 10 of the drawing, when column 1 of a card is at the read line, the pulse from the emitter is directed to the common of a selector 103, which being normally closed, provides a path to the tape read control relay 64. It has been explained that when a tape read relay 64 is energized, the tape read relay contacts 64–1 shown in Fig. 5 of the wiring diagram will close to energize the punch clutch for one punch clutch cycle.

Circuitry is shown in Fig. 5 for holding the tape read relay energized continuously until another signal de-energizes it. As shown in Fig. 5, the tape read relay has a hold coil, 65 connected across lines 58, 60 via a release contact point 105, a duplicate relay contact 93–5, a skip relay contact 107 and a normally open tape read contact 64–3. Accordingly, when the tape read relay coil 64 is energized the tape read contact 64–3 will be closed and hold through the tape read relay hold coil 65 and consequently will maintain all tape read relay contacts 64–1–65–3 closed, until the skip contact 107 is opened, or the duplicate contact 93–5 is opened, or the release contact 105 is opened. Accordingly, with the circuitry shown and the tape punched as it is in Fig. 2, machine cycles will continue once the tape read relay 64 is energized—with the cards and tape advancing column by column until a skip code is read in the tape. When the skip code is read, a skip relay is energized to open the skip contacts 107 in the tape read hold circuit and therefore the tape read hold relay 65 will drop out. (This stops the tape reading function.) The skip relay, when energized, also causes a card to be advanced to the first column of the next card field as described in U. S. Patent, 2,647,581. As viewed in Fig. 10, the emitter from column 20 then becomes active (since column 20 has been assigned as the first column of field 2) and the plugwire from column 20 passes an impulse through the common of the selector 111 to energize the tape read relay 64 to start machine cycles as described for the first field. The machine cycles for the second field will continue until another skip code is read in the tape (Fig. 2). Consequently, all the second fields of the card will be punched whereupon, with the reading of the skip code in the tape, the card will advance to the first column of the third field with the tape reader again turned off. The emitter at column 40 is then used (since col. 40 has been assigned as the first col. of field 3) to energize the tape read relay 64 (Fig. 10) to close the tape read contact 64–1 to again establish machine cycles, as described for fields 1 and 2. It is during this third field that the error code is read in the tape.

When the error is read in the third line of the tape, then to reiterate the principles of this invention, the card at the punch station is advanced to column 82 and a 4 hole is punched in that column signifying that it is an error card. The same card is then advanced to the read station where, after circuitry has been set up, the information in the two good fields of the card is duplicated into the next card at the punch station. During the duplication process the tape reader is turned off. After the two good fields have been duplicated, the card at the punch station will then receive its information from the tape reader in order to complete the card.

In the previous example, leading up to the error in field 3, as the first column of each card field is brought into alignment with the card read line, an end of line code (EL) reposed in the tape reader over the tape read pins, the end of line code is converted to an impulse in the analyzing network to close the EL selector contacts 116. The end of line relay is shown schematically in Fig. 9. If the end of line code at the end of line 1 in the tape is read while the emitter is in column 20, (and the emitter will stay in column 20 until the bail contacts 54–2 are closed by energization of punch magnets), than a pulse from the emitter will be available through the EL-selector contacts 116 to energize the selector 103 relay. Note that the tape read relay 64 is picked up before the tape reader can sense the end of line code in the tape and, consequently, the tape read hold relay 65 will be energized before the pulse is available through the end of line contacts 116–1 shown in Fig. 10.

Figure 11:
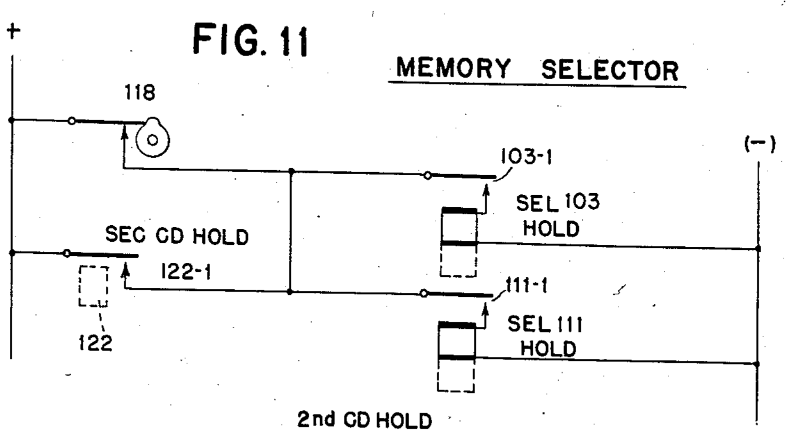
Fig. 11 is a schematic wiring diagram of the hold circuits of the line memory device.
Figure 12:
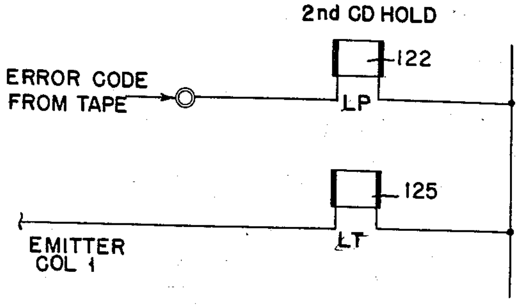
Fig. 12 is a schematic wiring diagram of another portion of the line memory device.

After the end of line code is read in the tape, a program 2 indication is also read without advancing the card. Then the tape reader reads the Figure 2 (of 235 Sanborn) which energizes a punch magnet and therefore closes the bail contacts 54–2 to advance the cards one column. The purpose of energizing the selector 103 is to provide a memory device to indicate that field 1 of the card (which is line 1 on the tape) has been satisfactorily completed. It will be noted from Fig. 11 that when the selector Sel 103 is picked up the contacts 103–1 in Fig. 11 are closed to permit a pulse to pass through the normally closed program cam contact 118 to energize the hold coil of the relay 103 thereby holding the relay 103 energized until the program cam contact is opened.

With reference to the second line on the tape, which is the second field in the card (235 Sanborn Avenue) the information will be read from the tape and punched in the card until the skip code is again read. At the time of the line 2 skip code, the tape reader will be shut off and the card will be advanced so that the first column of the third field is at the read station. As the card moves to the first column of the third field (column 40), the emitter is used to provide a pulse to the tape read control relay 64 to turn on the tape reader as described for line 2, the tape reader will then sense the end of line code (at end of line 2) thereby causing the selector Sel 111 to be picked up through the end of line selector contacts 116–2 as described for the end of line 1. The energization of selector 111 as shown in Fig. 11 causes Sel hold relay to be energized through the normally closed cam contact 118, and the selector contacts 111–1.

The 2 relays 103, 111 will remain energized as long as the program cam contact 118 remains closed. Obviously, any number of selectors could be employed so that 3, 4, 5 or more fields of the card could be noted as satisfactorily completed.

With reference to the tape again, during the third field, the tape reader will continue reading Oliver in the field causing the punching of Oliver in the third field of the card. Then the tape reader senses the error code in the tape whereupon two relays are energized through the analyzing network; namely, error release 120, and second card hold 122 (Fig. 9). The error release relay 120 releases the card to advance col. 82 to the read line. At column 82, the emitter provides a pulse through the transferred point 120–2 of the error release relay to the #4 punch magnet. Therefore, a 4 hole will be punched in the error card at column 82 to identify it as an error card. Incidentally, if the card at the punch station had been a good card (no error code in tape) the card would have had a normal release to emitter column 82. In a normal release, since the error release relay 120–2 is not energized, the #1 punch magnet is energized to punch a #1 hole in column 82 of the card at the punch station, thereby indicating a correctly punched card.

As mentioned, the second function of reading the error code in the tape was to energize a second card hold relay 122. The purpose of relay 122 is to close contacts 122–1 (Fig. 11) to establish a parallel hold circuit for the hold coils of relays 103, 111 when the program cam contact 118 is opened. The program cam contact provides a continuous hold pulse during the time any card is in process, and then opened momentarily after column 82 has been punched. The second card hold relay 122 is a well known latch type relay, which when energized remains latched until a trip coil 125 is impulsed to unlatch it. Since the program cam contact is again closed by column 1 of a card reaching the read line, a pulse from emitter column 1 is used to impulse the trip coil 125, thereby unlatching the second card hold relay 122.

When the error card reaches the read station with column 1 of the error card at the read line, and with the emitter also at column 1, then a pulse from the emitter (Fig. 10) will go to the common of the selector 103 which is now transferred. Consequently, instead of passing to the tape read relay 64, the pulse will go through the transferred side of the selector 103 and pick up the duplicate control relay Dup (93) which is shown in Fig. 10.

With reference to Fig. 9, it will be recognized that when the duplicate control relay is picked, the duplicate contact point 93 is switched which transfers the common 93 from the tape read contact 93–1 to the duplicate contact 93–2. Also, 93–4 is closed so that information read at the read line of the card is sent in card code, from the read line to energize the punch magnets in accordance with the information read in column 1 of the read station. This pattern is followed with column 2 of the error card, being at the read line as column 1 of the new card is punched at the punch line, etc., until all of the first field of the error card has been duplicated in the new card at the punch station.

The duplicate control relay, when energized, is held up under control of the program card through a complete field. The operation of the program card is described completely in U. S. Patent 2,647,581. The duplicate control relay 93 drops out automatically as a card advances into the first column of the next field (which is column 20 for field 2).

In column 20, a pulse from the emitter again calls for duplication since the selector 111 is transferred. The duplication process will be continued through the second field, and the duplicate relay will drop out when the card advances to the first column of the third field (column 40).

In column 40, a pulse from the emitter is shown passing directly to the tape read control relay 64 (but it could have passed through the common of another selector if one had been provided which would not be transferred since the error occurred in field 3). Energization of the tape read control relay 64 puts the machine back under the control of the tape, and the third field will be punched in accordance with the correct information in the tape, and the card will then be normally released to punch a #1 hole in column 82.

With the circuitry provided the correct information in the fields of the card at the read station will be duplicated in the new card at the punch station and the incorrect information in the card at the read station will be discarded whereupon the card at the punch station will then be punched in compliance with the information in the tape at that line. If another error is made upon retyping line 3, another error code will be punched into the tape, then the new card is still available as memory storage for the first two lines which are to be repeated in the next card at the punch station. The reason can be seen in Fig. 11 of the drawing. It has been mentioned that selector relays 103, 111 are energized when an end of line code is read in the tape at the proper column indicating that the previous line was properly punched. The selector relays 103, 111 were then held up between cards by the second card hold contact 122–1 until the program cam contact 118 was again closed. Accordingly, the selector relays 103, 111 will continue to be held up through all of the second card, and if another error code is read in the tape during the third line correction, then the second card hold contact 122–1 will be reimpulsed to hold the selector relays 103, 111 energized while new cards are being registered with the read and punch lines of the card punch. It is only after the third line is properly punched and a release code is read from the tape, that the selector relays 103, 111 will be dropped out between cards.

With the circuitry and structure described it will be recognized that if an error is made in the first line of the tape then there is no memory storage provided or required. However, if line 1, is properly punched and an error is made in line 2 then line 1 is remembered and will be duplicated in a new card which is advanced to the punch station. Also if lines 1 and 2 were properly punched and an error made in line 3 then lines 1 and 2 would be stored and duplicated in a new card brought into alignment with the punch station. This process can be continued for each new field as required merely by duplicating the circuitry described.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a statistical card punching machine having a card read station and a card punching station with mechanism for advancing a card column by column through both of said stations simultaneously and for sequentially advancing a card from said punch station to said read station and having further mechanism for conditioning said punch station to punch information read either from a record or from said card read station, a device for conditioning said machine after an error notation has been sensed in said record, to duplicate correct portions of the card in which the error was punched after said card has been advanced to said card read station and a new card positioned at said card punch station, comprising in combination, an emitter conditioned to emit an electrical impulse as the first column of a card reaches said read station, and circuit means having therein a record read relay, which when impulsed conditions said machine to punch information read from said record and a duplicate relay which when impulsed conditions said machine to punch information read from a card at said read station, a transfer switch having a normally closed side electrically connected to said record read relay and the normally open side connected to said duplicate relay, said transfer switch having a common point electrically connected to said emitter, said circuit means further having connections to condition said transfer switch to be transferred after a predetermined code has been read in said record which code is assigned to indicate a correctly punched card portion, said circuit means further having connections to condition said machine after an error code has been noted in said record and punched in a card at said punch station to advance the error card to said read station and a new card to said punch station whereupon a pulse from said emitter causes duplication of correct information from said error card to said new card.

2. A mechanism in accordance with claim 1 wherein said circuit means is further provided with connections for holding said transfer switch in its transferred position and for de-energizing the same for return to its normal position as a card is advanced from the card punch station to the card read station.

3. A mechanism in accordance with claim 2 wherein said circuit means is further provided with connections for holding said transfer switch in its transferred condition as an error card is advanced from said card punch station to said card read station, said additional circuit means including a latch type relay having contacts in a circuit for holding said transfer switch in its transferred position as a card is advanced from said card punch station to said card read station, and means for unlatching said relay when the first column of the error card reaches said card read station.

4. A mechanism in accordance with claim 1 wherein said card punch is operable in field units by providing a transfer switch for each field and conditioning said emitter to send an impulse to the common of a transfer switch as the first column of its assigned field is brought into alignment with said card read station, each of said transfer switches having a normally closed side electrically connected to a respective tape read relay, and a normally open side electrically connected to a respective duplicate relay, circuit means for transferring said transfer switch each time an assigned code is read in the record to indicate that the previous field had been properly punched, said machine being conditioned normally to hold all of said transfer switches in their transferred condition until a card is advanced from said punch station to said read station, and means for holding said transfer switches in their transferred condition if an error code is noted in said record while the error card is advanced to said card read station whereupon as an emitter column sends an impulse to the common of its assigned transfer switch the machine will be conditioned to duplicate all those fields wherein the transfer switch has been transferred and the machine will be conditioned again for tape reading when a field is reached wherein its transfer switch has not been transferred.

5. A mechanism in accordance with claim 4 wherein a hold circuit is provided for said tape read relay whereby once it has been energized by a pulse from said emitter said tape read relay will be held energized until another predetermined code is read from said record.

6. A mechanism in accordance with claim 4 wherein a hold circuit is provided for said duplicate relay to hold the same energized through a card field once said duplicate relay has been picked up by a pulse from said emitter.

7. A mechanism in accordance with claim 1 wherein said circuit means is further provided with connections to condition said machine to punch a selected hole in a predetermined card column if no error is noted in the record, and a different hole in said predetermined card column if an error is noted in said record.

8. In a statistical card punching machine having a card punching station and a card reading station with mechanism for advancing a card column by column through each of said stations and for sequentially advancing a card from said punching station to said reading station and having means for sensing data either from a record or from said card reading station, a device for conditioning said machine after an error notation has been sensed in said record to duplicate correct columns of the card in which said error was punched after said card has been advanced to said card read station comprising, in combination, an emitter conditioned to provide an electrical output impulse for selected columns of a card at said read station, circuit means including a transfer switch having a common point electrically connected to a predetermined output of said emitter, means effective to operate said transfer switch from a first position to a second position after a predetermined code has been read in said record which code is assigned to indicate a correctly punched card portion, a record read relay responsive when impulsed from said predetermined output of said emitter through said transfer switch in said first position to cause said machine to punch data sensed from said record, a duplicate relay responsive when impulsed from said predetermined output of said emitter through said transfer switch in said second position to cause said machine to punch data read from a card at said read station, and means to condition said machine after an error has been sensed in said record and punched in said card at said punching station to position the error card at said read station where the predetermined output of said emitter is effective to impulse said duplicate relay.

9. A device in accordance with claim 8 wherein circuit means are provided to impulse said record read relay effective when the correct data from said error card has been reproduced in said new card.

10. A device in accordance with claim 8 wherein a second transfer switch is provided having a common point electrically connected to a second predetermined output of said emitter, means effective to operate said second transfer switch from a first position to a second position after a predetermined code has been read in said record which code is assigned to indicate a second correctly punched card portion, circuit means associated with said record read relay effective when said second transfer switch is in its first position, circuit means associated with said duplicate relay effective when said second transfer switch is in its second position, and means to condition said machine after an error has been noted in said record and punched in said card at said punch station to impulse said duplicate relay from said second predetermined output of said emitter.

References Cited in the file of this patent

UNITED STATES PATENTS

| | | |
|---|---|---|
| 2,013,534 | Campbell | Sept. 3, 1935 |
| 2,165,302 | Rabenda | July 11, 1939 |
| 2,298,416 | Ritzert | Oct. 13, 1942 |